United States Patent [19]

Schultz

[11] Patent Number: 4,986,299

[45] Date of Patent: Jan. 22, 1991

[54] REVERSIBLE POPPET VALVE CARTRIDGE

[75] Inventor: Gary R. Schultz, Kalamazoo, Mich.

[73] Assignee: Eaton Corporation, Cleveland, Ohio

[21] Appl. No.: 402,409

[22] Filed: Sep. 5, 1989

[51] Int. Cl.$^5$ .......................................... F16K 31/122
[52] U.S. Cl. .................... 137/269; 251/63.4; 251/63.6
[58] Field of Search ............... 137/269, 270; 251/63.6, 251/63.4

[56] References Cited

U.S. PATENT DOCUMENTS

| 2,911,994 | 11/1959 | Branson | 137/270 |
| 3,123,091 | 3/1964 | Elsey | 137/270 |
| 3,561,468 | 2/1971 | Sugden | 137/270 X |
| 3,598,148 | 8/1971 | Kroffke | 251/30 X |
| 3,606,911 | 9/1971 | Keith | 137/270 X |
| 4,421,292 | 12/1983 | Matsui | 251/3.6 X |
| 4,501,289 | 2/1985 | Pauliukonis | 137/315 |

Primary Examiner—Alan Cohan
Attorney, Agent, or Firm—P. S. Rulon

[57] ABSTRACT

A solenoid (30) controlled, pilot air actuated valve assembly (10) includes a poppet valve cartridge (20) which is either of the normally open type or normally closed type by reversing assembly of identical component parts.

15 Claims, 1 Drawing Sheet

U.S. Patent   Jan. 22, 1991   4,986,299
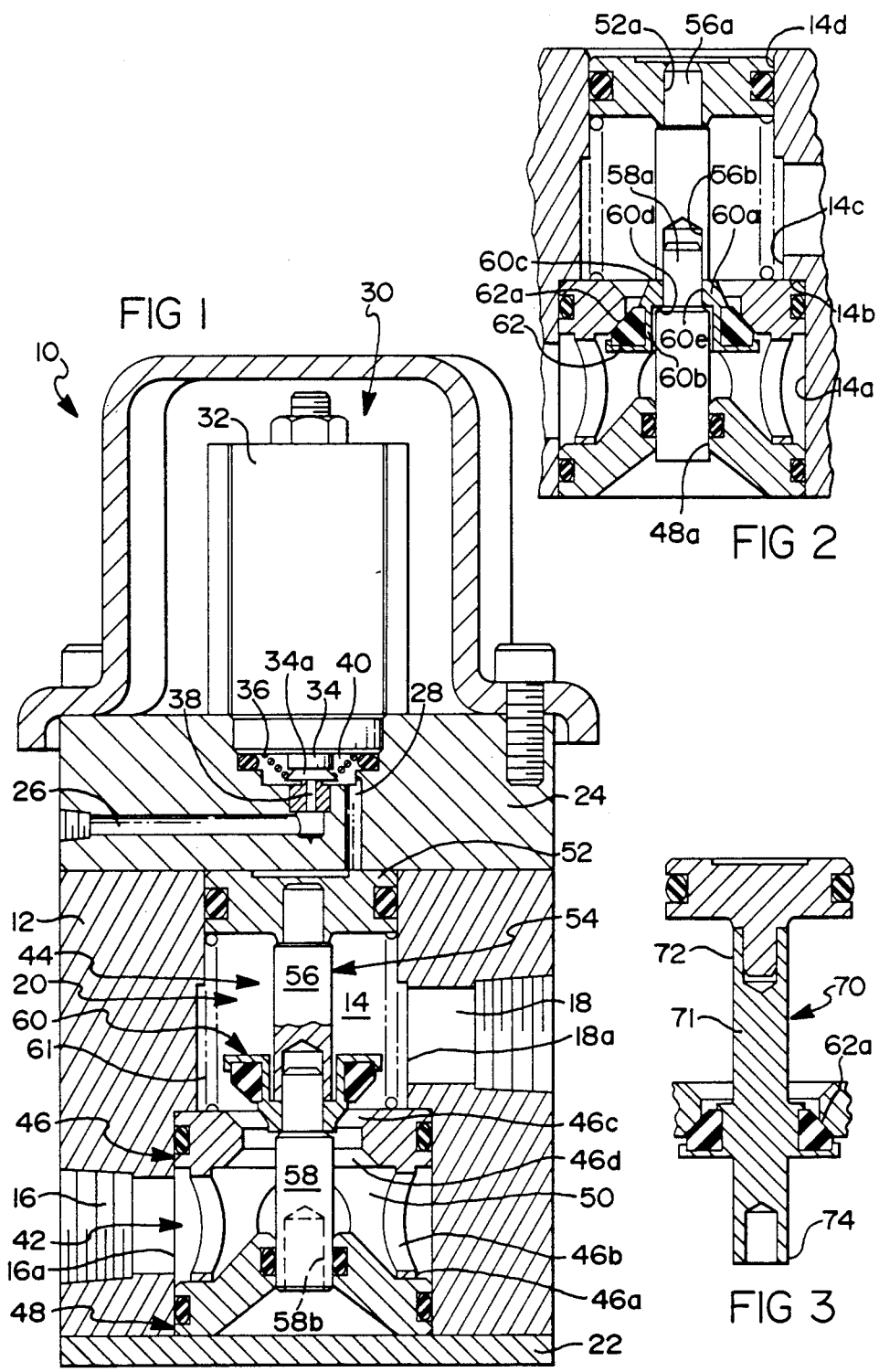

REVERSIBLE POPPET VALVE CARTRIDGE

FIELD OF THE INVENTION

This invention relates to poppet valve cartridges for solenoid controlled, pilot air actuated valve assemblies.

BACKGROUND OF THE INVENTION

Solenoid controlled, pilot air actuated valve assemblies having poppet valve cartridges are known in the prior art. U.S. patent application Ser. No. 232,262, filed Aug. 15, 1989, discloses such a valve assembly in a vehicular central tire inflation system (CTIS), which system is also disclosed in U.S. Pat. No. 4,640,331. Both of these documents are incorporated herein by reference.

In the above mentioned application there is disclosed two normally open and one normally closed solenoid controlled, pilot air actuated valve assemblies for controlling inflation and deflation of vehicle tires from a central location. When each of these valve assemblies employs a poppet valve cartridge, they differ only with respect to whether the cartridge is normally open or closed, and only with respect to passages which direct fluid to and from a bore containing the cartridge in a body of the valve assembly.

An object of the present invention is to provide a modular cartridge which is readily assembled of identical components to be either normally open or closed, and which may direct fluid via standard passages in the valve assembly body, whereby normally open or closed valve assemblies are provided by a single design and inventory of cartridge components and valve assembly bodies.

BRIEF DESCRIPTION OF THE DRAWINGS

The poppet valve cartridge of the present invention is shown in the accompanying drawing in which:

FIG. 1 is a cross-sectional view of a solenoid controlled, pilot air actuated valve showing a normally open configuration of the cartridge;

FIG. 2 is a partial cross-sectional view of a normally closed configuration of the cartridge; and FIG. 3 is a second embodiment of a poppet assembly of the cartridge.

DETAILED DESCRIPTION OF THE DRAWINGS

Looking now at FIGS. 1 and 2 therein is illustrated a valve mechanism 10 including a valve body or housing 12 having a stepped bore 14 and passages 16,18, a poppet valve cartridge 20 disposed in the bore, a bottomplate 22 closing the bottom of the bore, a top-plate 24 covering the top of the bore and having passages 26,28 for directing pilot air from an unshown source of pressurized air to the top of the bore via a normally closed solenoid valve assembly 30 of a known type.

Solenoid valve assembly 30 includes a coil assembly 32 and an axially movable plunger 34 having an end 34a biased by a spring 36 into engagement with a valve seat 38 communicating with passage 26. When the solenoid coil is energized, plunger end 34a moves away from seat 38 against the bias of spring 36 to allow pilot air to flow to the top of bore 14 via a space 40 and passage 28. The other end of plunger 34, in known manner, controls a passage for venting space 40 when the plunger end 34a is in engagement with valve seat 38.

Cartridges 20 in FIGS. 1 and 2 are composed of the same component parts with the parts in FIG. 1 assembled to provide a normally open cartridge and with the same parts in FIG. 2 assembled to provide a normally closed cartridge. Cartridge 20 includes a sleeve assembly 42 and a poppet assembly 44. The sleeve assembly includes first and second annular members 46,48 disposed in a greater diameter bore portion 14a of bore 14. The members are axially separated by a skirt or apertured means 46a extending therefrom and formed separately or with either of the members. Herein, the skirt is formed with member 46. The skirt includes a plurality of apertures 46b for allowing fluid communication between an inner volume 50 and an opening 16a of passage 16 into the cylindrical walls of bore portion 14a. The annular members straddle passage opening 16a and include outer annular portions which sealingly cooperate with the bore walls via O-ring seals. Annular member 46 abuts a bore shoulder 14b and is axially fixed there against by member 48 which abuts the bottom plate 22. Member 46 includes first and second mirror image, conical valve seats 46c, 46d facing generally in axially opposite directions about a periphery of a central opening which is selectively opened and closed to control fluid communication between the inner volume 50 and an opening 18a of passage 18 in the cylindrical walls of an intermediate diameter bore portion 14c of bore 14.

Poppet assembly 44 includes a piston 52 slidably and sealingly disposed in a lesser diameter bore portion 14d of bore 14, a stem 54 including identical first and second elongated members 56,58, and a poppet member 60. Bore portions 14c,14d may be the same in diameter. The piston is biased away from the sleeve assembly by the force of a spring 61 which, herein, reacts between the piston and the sleeve assembly. The spring may be located in other positions, for example, between the lower-end of stem 54 and bottom plate 22. Members 56,58 each have a reduced diameter end portion 56a,58a extending axially from one end and an axially extending opening 56b,58b in the other end. The poppet member includes a transverse flange portion 60a and a skirt portion 60b extending axially therefrom for supporting an elastomeric member 62 defining a conical poppet surface 62a. The poppet surface is axially displaced from the flange, faces axially in the direction of a first surface 60c of the flange and opposite a second surface 60d thereof. End portion 56a is fixedly received in an opening 52a in piston 52 such that member 56 extends axially therefrom along an axis common the the piston, the bore and annular members 46,48. End portion 58a extends through an opening 60e in poppet member flange 60a and is fixedly received in the opening 56b, thereby securing poppet member 60 between adjacent ends of the elongated members to provide a normally open cartridge when the poppet surface 62a is between piston 52 and first annular member 46 as shown in FIG. 1 or to provide a normally closed cartridge when poppet surface 62a is below the first annular member and engaged with valve seat 46d as shown in FIG. 2. The remainder of elongated member 58 extends along the common axis, through the central opening in first member 46, and slidingly and sealingly into a guide opening 48a in second annular member 48. The area between the second annular member and the bottom plate may be provided with a vent passage, not shown. The bottom and top plates are secured and sealed to the valve body in known manner. Any of several known means may be used to fix the stem ends to the piston and to each other, for example, press fits or screw threads.

In the normally open cartridge configuration of FIG. 1, selective energization of solenoid coil 32 allows pressurized pilot air to flow to the top of bore 14 and apply a force to piston 52 counter to the force of spring 61 for moving poppet surface 62a into abutting engagement with the first valve seat 46c. In the normally closed configuration of FIG. 2, spring 61 biases poppet surface 62a into abutting engagement with the second valve seat 46d and the force of the pilot air selectively acting on piston 52 moves poppet surface 62a away from seat 46d.

FIG. 3 illustrates a second poppet assembly embodiment 70 employing a stem 71 and poppet formed as a single member 70 having first and second ends 72,74 which merely need to be reversed to convert the cartridge assembly from the normally closed configuration in FIG. 3 to the normally open configuration of FIG. 1.

Two embodiments of the invention have been disclosed for illustrative purposes. Many variations and modifications of the embodiments are believed to be within the spirit of the invention. The following claims are intended to cover the inventive portions of the embodiments and variations and modifications within the spirit of the invention.

What is claimed is:

1. A poppet valve cartridge adapted to be installed in a bore of a valve body; the cartridge comprising:

a sleeve assembly having in inner volume defined by first and second annular members concentric to a common axis and axially spaced apart by an apertured means extending therebetween, first and second mirror image valve seats facing axially in opposite directions about a periphery of a central opening in the first annular member;

a poppet assembly including a piston axially spaced from an end of the sleeve assembly defined by the first annular member, a spring applying a force biasing the piston axially away from the sleeve assembly, a generally axially facing poppet surface defined by a poppet concentrically affixed to a stem affixed at one end to the piston and extending axially therefrom through the central opening and slidably received in a guide opening in the second annular member, the stem affixable to the piston with the poppet surface disposed between the piston and the first seat and movable into abutting engagement therewith in response to a force applied to the piston counter to the spring force, whereby the cartridge is normally open, and the stem affixable to the piston with the poppet surface abuttingly engaging the second valve seat and movable therefrom in response to the counter force applied to the piston, whereby the cartridge is normally closed; and the poppet being a separate poppet member having a first side facing axially in the direction of the poppet surface, the stem including a first elongated portion and a second elongated member, the elongated portion and member having axial ends with the poppet member abuttingly fixed therebetween, the other axial ends of the elongated portion and member respectively affixed to the piston and slidably extending through the guide opening, the first side of the poppet member abutting the adjacent end of the first elongated portion to form the normally closed cartridge wherein the poppet surface is axially spaced further from the piston than the other end of the second elongated member, and the first side abutting the adjacent end of the elongated member to form the normally open cartridge wherein the poppet surface is axially spaced further from the other end of the second elongated member than from the piston.

2. The cartridge of claim 1, wherein the guide opening is in sealing relation with the stem.

3. The cartridge of claim 1, wherein the elongated portion is a separate first elongated member identical to the first elongated member, one of the adjacent ends having a reduced diameter portion extending axially through an opening in the poppet member and secured in an opening in the adjacent end of the other member.

4. The cartridge of claim 3, wherein the reduced diameter portion extends from the adjacent end of the second elongated member.

5. A valve assembly including a valve body having a bore with an axis and first and second axially separated passage openings in cylindrical walls of the bore; a poppet valve cartridge in the bore including sleeve means and poppet means respectively fixed and axially movable in the bore, the sleeve means having first and second annular portions sealingly cooperating with the bore walls, the annular portions straddling one of the passage openings and axially separated by apertured strut means extending therebetween and allowing fluid communication between a radially inner volume of the sleeve means and the one passage openings, the first annular portion having a first coaxial valve seat facing radially inward and axially in one direction, the poppet means including an axially extending portion having axially separated piston and poppet portions fixed thereto, the poppet portion having a mating valve seat movable into or out of sealing relation with the first seat in response to a pilot air selectively acting on the piston in a direction opposite a force of a spring biasing the poppet means; characterized by:

the bore having lesser and greater diameter portions at its opposite ends and a shoulder intermediate the passage openings, the shoulder defining the inner axial extent of the greater diameter portion, the piston being in sliding sealing relation with the walls of the lesser diameter portion, and the sleeve means disposed in the greater diameter portion with the first portion thereof abutting the shoulder;

the first and second portions of the sleeve means being separate members, the first member having a second conical valve seat facing radially inward and axially in the opposite direction of the first valve seat; and the axially extending portion of the poppet means including a first elongated portion and a second elongated member having adjacent ends affixed to first and second opposite axially facing sides of an annular poppet member defining the poppet portion, the other axial ends of the elongated portion and member respectively affixed to the piston and slidably extending through a guide opening in the second annular member of the sleeve means; and the first side of the poppet member and the mating valve seat thereof facing axially in the same direction, the mating valve seat positioned between the piston and the first valve seat when the second side of the poppet member is affixed to the first elongated portion and movable into engagement with the first valve seat in response to pilot air acting on the piston, and the mating valve seat in engagement with the second seat when the first side of the poppet member is affixed to the first elongated portion and movable out of engagement with the second valve seat in response to pilot air action on the piston.

6. A poppet valve cartridge adapted to be installed in a bore of a valve body; the cartridge comprising:

a sleeve assembly having an inner volume defined by first and second annular members concentric to a common axis and axially spaced apart by an apertured means extending therebetween, first and second mirror image valve seats facing axially in opposite directions about a periphery of a central opening in the first annular member; and a poppet assembly including a piston axially spaced from an end of the sleeve assembly defined by the first annular member, a spring reacting between the sleeve assembly and the piston for applying a force biasing the piston axially away from the sleeve assembly, a generally axially facing poppet surface defined by a poppet concentrically affixed to a stem affixed at one end to the piston and extending axially therefrom through the central opening and slidably received in a guide opening in the second annular member, the stem affixable to the piston with the poppet surface disposed between the piston and the first seat and movable into abutting engagement therewith in response to a force applied to the piston counter to the spring force, whereby the cartridge is normally open, and the stem affixable to the piston with the poppet surface abuttingly engaging the second valve seat and movable therefrom in response to the counter force applied to the piston, whereby the cartridge is normally closed.

7. The cartridge of claim 6, wherein the guide opening is in sealing relation with the stem.

8. The cartridge of claim 6, wherein the poppet is a separate poppet member having a first side facing axially in the direction of the poppet surface, the stem including a first elongated portion and a second elongated member, the elongated portion and member having adjacent axial ends with the poppet member abuttingly fixed therebetween, the other axial ends of the elongated portion and member respectively affixed to the piston and slidably extending through the guide opening, the first side of the poppet member abutting the adjacent end of the first elongated portion to form the normally closed cartridge wherein the poppet surface is axially spaced further from the piston than the other end of the second elongated member, and the first side abutting the adjacent end of the elongated member to form the normally open cartridge wherein the poppet surface is axially spaced further from the other end of the second elongated member than from the piston.

9. The cartridge of claim 8, wherein the elongated portion is a separate first elongated member identical to the first elongated member, one of the adjacent ends having a reduced diameter portion extending axially through an opening in the poppet member and secured in an opening in the adjacent end of the other member.

10. The cartridge of claim 9, wherein the reduced diameter portion extends from the adjacent end of the second elongated member.

11. A valve assembly including a valve body having a bore with an axis and first and second axially separated passage openings in cylindrical walls of the bore intermediate first and second ends of the bore;

a solenoid valve assembly mounted on the valve body and operative when energized to direct a pressurized fluid to the first end of the bore and when de-energized to exhaust the fluid in the first end;

a poppet valve cartridge disposed in the bore, the cartridge comprising:

a sleeve assembly having an inner volume defined by first and second annular members concentric to the bore axis and axially spaced apart by an apertured means extending therebetween with the first annular member fixed axially intermediate the openings and the second member fixed axially at the end of the bore, first and second mirror image valve seats facing axially in opposite directions about an inner periphery of a central opening in the first annular member;

a poppet assembly including a piston slidably disposed in the bore intermediate the first end of the bore and the second passage opening, the piston axially movable away from the first end of the bore by the pressurized fluid in response to energization of the solenoid valve assembly, a spring reacting between the sleeve assembly and the piston for applying a force biasing the piston toward the first end of the bore and away from the sleeve assembly, a generally axially facing poppet surface defined by a poppet concentrically affixed to a stem affixed at one end to the piston and extending axially from the piston through the central opening and slidably received in a guide opening in the second annular member, the stem affixable to the piston with the poppet surface disposed between the piston and the first seat and moved into abutting engagement therewith by the pressurized fluid in response to energization of the solenoid valve assembly, whereby the cartridge is normally open, and the stem affixable to the piston with the poppet surface abuttingly engaging the second valve seat and movable therefrom by the pressurized fluid in response to energization of the solenoid valve assembly, whereby the cartridge is normally closed.

12. The cartridge of claim 11, wherein the guide opening is in sealing relation with the stem.

13. The cartridge of claim 11, wherein the poppet is a separate poppet member having a first side facing axially in the direction of the poppet surface, the stem including a first elongated portion and a second elongated member, the elongated portion and member having adjacent axial ends with the poppet member abuttingly fixed therebetween, the other axial ends of the elongated portion and member respectively affixed to the piston and slidably extending through the guide opening, the first side of the poppet member abutting the adjacent end of the first elongated portion to form the normally closed cartridge wherein the poppet surface is axially spaced further from the piston than the other end of the second elongated member, and the first side abutting the adjacent end of the elongated member to form the normally open cartridge wherein the poppet surface is axially spaced further from the other end of the second elongated member than from the piston.

14. The cartridge of claim 13, wherein the elongated portion is a separate first elongated member identical to the first elongated member, one of the adjacent ends having a reduced diameter portion extending axially through an opening in the poppet member and secured in an opening in the adjacent end of the other member.

15. The cartridge of claim 14, wherein the reduced diameter portion extends from the adjacent end of the second elongated member.

* * * * *